US008223600B2

(12) United States Patent
Barbian et al.

(10) Patent No.: US 8,223,600 B2
(45) Date of Patent: Jul. 17, 2012

(54) NETWORK-ATTACHABLE, FILE-ACCESSIBLE STORAGE DRIVE

(75) Inventors: Douglas F. Barbian, Lakewood, CO (US); Richard Chaney, Elbert, CO (US); Jean-Pierre Guignard, Toulouse (FR); Victor Wilmot Hudson, Fort Collins, CO (US); Fernando Moreira, Plaisance du Touch (FR); Curtis Mulder, Boulder, CO (US); Mark Ostlund, Pleasanton, CA (US); Franck Paulus, Toulouse (FR); Sebastien Rabaud, Toulouse (FR)

(73) Assignee: Quantum Corporation, San Jose, CA (US)

( * ) Notice: Subject to any disclaimer, the term of this patent is extended or adjusted under 35 U.S.C. 154(b) by 748 days.

(21) Appl. No.: 11/397,415

(22) Filed: Apr. 3, 2006

(65) Prior Publication Data

US 2007/0067364 A1     Mar. 22, 2007

Related U.S. Application Data

(60) Provisional application No. 60/669,058, filed on Apr. 6, 2005, provisional application No. 60/671,950, filed on Apr. 15, 2005.

(51) Int. Cl.
*G11B 21/08* (2006.01)
(52) U.S. Cl. ........................................ 369/30.4; 711/100
(58) Field of Classification Search .................. 711/112, 711/4, 100, 154; 386/117; 707/827, 831; 369/30.4, 65

See application file for complete search history.

(56) References Cited

U.S. PATENT DOCUMENTS

| | | | | |
|---|---|---|---|---|
| 4,766,581 A * | 8/1988 | Korn et al. | ................... | 369/30.4 |
| 5,150,473 A * | 9/1992 | Zulch | ............................ | 711/162 |
| 5,365,224 A * | 11/1994 | McKechnie et al. | ...... | 340/825.52 |
| 5,454,098 A * | 9/1995 | Pisello et al. | .................... | 703/24 |
| 5,787,087 A * | 7/1998 | Visser et al. | .................. | 370/420 |
| 5,892,633 A * | 4/1999 | Ayres et al. | ................ | 360/73.08 |
| 6,654,865 B2 * | 11/2003 | Hudson | ........................ | 711/202 |
| 6,732,137 B1 * | 5/2004 | Dearing et al. | ............... | 718/100 |
| 7,076,560 B1 * | 7/2006 | Lango et al. | .................. | 709/231 |
| 7,177,108 B2 | 2/2007 | Payne et al. | | |
| 7,389,379 B1 * | 6/2008 | Goel et al. | ..................... | 711/112 |
| 7,568,080 B2 * | 7/2009 | Prahlad et al. | ................ | 711/162 |
| 2005/0025453 A1 * | 2/2005 | Kimura | ............................ | 386/46 |
| 2008/0250198 A1 * | 10/2008 | Purchase et al. | .............. | 711/113 |

OTHER PUBLICATIONS

SMPTE Standard for Television-Material Exchange Format (MXF), Sep. 22, 2004, The Society of Motion Picture and Television Engineers.*

(Continued)

*Primary Examiner* — Asad M Nawaz
*Assistant Examiner* — Marie Georges Henry
(74) *Attorney, Agent, or Firm* — Baker Botts L.L.P.

(57) ABSTRACT

Storage drive logic and a standalone tape file structure are described. File transfer logic transfers file data to and from a network according to a first protocol. Media access logic accesses a sequential-access storage medium associated with the drive according to a second protocol. Media management logic translates file-based commands received from the network according to the first protocol into sequential-access device commands according to the second protocol. The device commands control accessing of data by the drive. The storage medium may be a magnetic tape including a data region for storing data in a file format, and a table of contents (TOC) region for storing a table of contents that indexes the locations of files within the data region.

42 Claims, 7 Drawing Sheets

OTHER PUBLICATIONS

SMPTE Standard for Television-Material Exchange Format (MXF), Sep. 22, 2004, The Society of Motion Picture and Television Engineers.*

"SMPTE Standard for Television-Material Exchange Format (MXF) File Format Specification (Standard)," (Sep. 22, 2004). SMPTE 337M-2004, The Society of Motion Picture and Television Engineers, pp. 1-101.

* cited by examiner

TOC Format

| File A File system Metadata | File A MXF Metadata | File B File system Metadata | File C File system Metadata | File C MXF Metadata |

Figure 5

NETWORK-ATTACHABLE, FILE-ACCESSIBLE STORAGE DRIVE

CROSS REFERENCE TO RELATED APPLICATIONS

This application claims the benefit of U.S. Provisional Application No. 60/669,058, entitled, "NETWORK-ATTACHABLE, FILE-ACCESSIBLE STORAGE DRIVE", filed on Apr. 6, 2005, and U.S. Provisional Application No. 60/671,950, entitled, "NETWORK-ATTACHABLE, FILE-ACCESSIBLE STORAGE DRIVE", filed on Apr. 15, 2005, the disclosures of which are incorporated herein in their entirety.

BACKGROUND OF THE INVENTION

1. Field of the Invention

The present invention generally relates to storage devices, and more particularly to a storage drive that operates on a network.

2. Related Art

FIG. 1 illustrates a conventional storage area network (SAN) 100. A tape library 102 includes multiple tape drives 104, into which are inserted tape cartridges 106 for storing data. A user on the network, by using a controlling node such as an automation server 108, may wish to transfer files between the library and other nodes on the network, such as video servers 110.

Current tape drives and libraries communicate data using a device protocol, such as SCSI or fiber channel interface. However, users on the network may be operating workstations that communicate with the network according to a network protocol, such as the Ethernet Internet protocol. Referring to FIG. 1, an archive (or storage) manager 112 performs the protocol translation between the device protocol and the network protocol in a conventional network. Based upon that translation, data movers 114 in the archive manager 112 respectively read or write data from and to the tape drives 104 according to the device protocol.

Moreover, typical tape drives employ a raw data format requiring the addressing of information in block format, for example. However, users typically want to access data using a file format. The archive manager 112 handles the conversion between the file format and the raw data format. The archive manager, using a database server 116, also stores metadata about the data stored in the libraries, providing a mapping of files to physical locations of the data in the libraries.

Conventional tape backup host applications store on tape a set of selected files from hard drive for back up. The application may store a table of contents (TOC) for each backup data set. The TOC may be stored on tape, as well as in semiconductor memory on the server running the host application. Multiple backup data sets may store some files in common, e.g., the same file stored at different times.

The application uses the TOC to determine where the drive head must move to access a specified file in a particular data set on the tape. However, the host application must have specific knowledge of all data sets on the tape to find the TOC containing the block location for the specified file. Because multiple copies of the same file may be stored in different data sets, the host must employ a complicated set of rules to find the correct TOC containing the correct block locations for the correct copy of the specified file. The disadvantage of this arrangement is that it relies solely on the host application to find the requested data file. Also, the host must read all the TOCs, until the correct TOC is located, to find the correct block locations for the correct copy of the specified file.

Another disadvantage to the current SAN configuration is that the software available on the market today for the archive manager and data movers is proprietary and may change over time. This contrasts with the need to be able to archive data in libraries for very long durations without concern for dependency on third party software.

BRIEF SUMMARY OF THE INVENTION

Some aspects of the invention provide storage drive logic for operation on a network. File transfer logic transfers file data to and from the network according to a first protocol. Media access logic accesses a sequential-access storage medium associated with the drive according to a second protocol. Media management logic translates file-based commands received from the network according to the first protocol into sequential-access device commands according to the second protocol. The device commands control accessing of data by the drive.

The file transfer logic may, for example, comprise an FTP server, the storage drive a tape drive, the storage medium magnetic tape, and the second protocol a tape communication protocol. The first protocol may be an Ethernet protocol, and the second protocol a SCSI protocol The file data may comprise multiple files, each file including a data payload and metadata. According to some aspects of the invention, the media management logic may store the data payload into the storage medium, and store metadata including a table of contents (TOC) that indexes files to physical locations of corresponding data payloads on the storage medium. The media management logic may write the metadata near the beginning of the storage medium without erasing existing data on the storage medium.

According to some aspects of the invention, the media management logic may select a portion of the data payload from the storage medium for transfer to the network, and modify the metadata associated with the data payload to reflect characteristics of the selected portion of the data payload, so as to enable the transfer to the network of the selected portion of the data payload and the associated modified metadata.

According to some aspects of the invention, a magnetic tape includes a data region for storing data in a file format, and a table of contents (TOC) region for storing a table of contents that indexes the locations of files within the data region. The TOC region may be located before the data region with respect to a direction of writing the data to the tape. The TOC in the TOC region may be modified without erasing any data in the data region. The TOC region may be located near a beginning of the tape.

BRIEF DESCRIPTION OF THE DRAWINGS

FIG. 5 illustrates the structure of the table of contents according to an embodiment of the invention.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
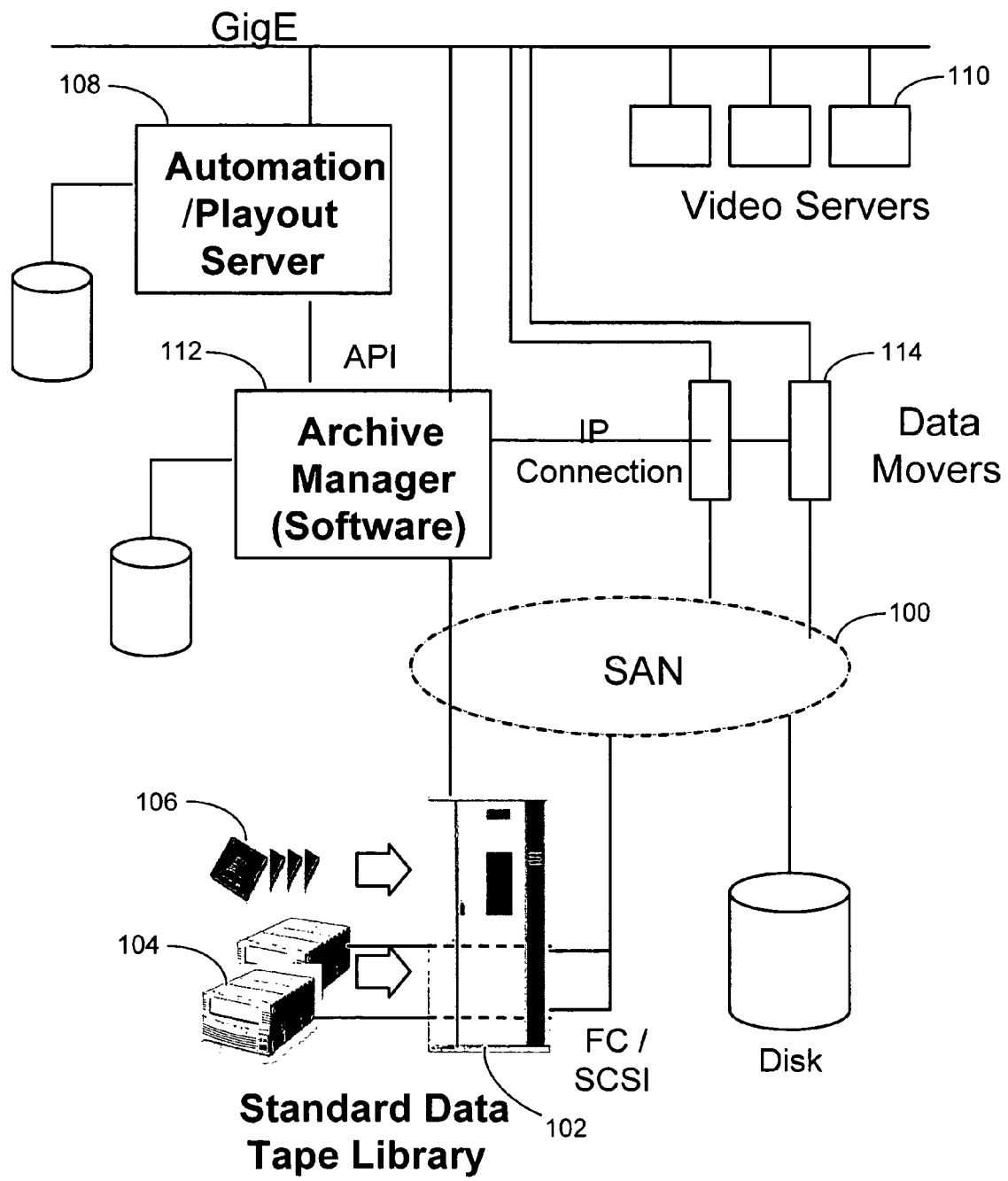
FIG. 1 illustrates a conventional storage area network.
Figure 2:
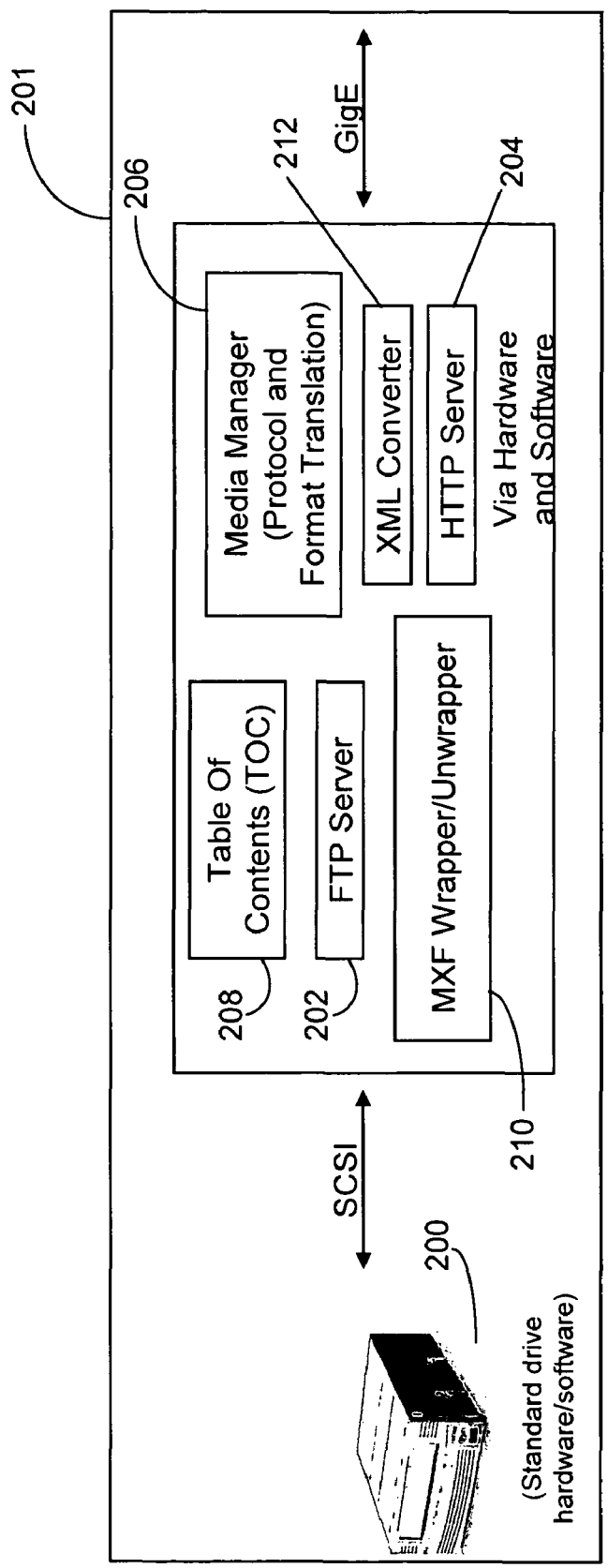
FIG. 2 illustrates a storage drive according to an embodiment of the present invention.

FIG. 2 illustrates a storage drive 201 according to an embodiment of the present invention. The drive includes media access logic, such as that found in a standard storage drive 200 (e.g., the SDLT600 tape drive manufactured by the assignee of the invention), for reading and writing data from and to a storage medium associated with the drive. Data transfer logic 202 associated with the enhanced drive of the invention transfers data to and from the network. The data transfer logic 202 may be, for example, an FTP server within the drive of the invention. An http server 204 allows a user on the network to access the storage drive according to an embodiment of the invention.

The data transfer logic 202 communicates with the network according to a first protocol, whereas the media access logic in the standard drive 200 communicates data according to a second protocol. A media manager 206 handles the translation between the first and second protocols, thereby removing the necessity to have that functionality elsewhere in the network. The storage drive may be a tape drive, the first protocol a network protocol, such as Ethernet, and the second protocol a device protocol, such as SCSI or fiber channel interface.

The media manager 206 also may translate commands received from the network in a file format to another format, such as a data block format used by a standard tape drive. The commands control the communication of data between the drive and nodes on the network. Where the data transfer logic 202 includes an FTP server, the media manager 206 may include modifications to standard FTP commands to translate file-based commands to commands that access and manipulate data in other formats, such as commands for a tape drive that accesses and manipulates data blocks in a linear format. In that case, the media manager 206 may, for example, map each file into corresponding data blocks, and separate the files by SCSI file marks. The media manager 206 may store in memory the location of the first block in each file as metadata indicating the location of a file.

The data may comprise at least one file, which itself may comprise a data payload and metadata. The media manager 206 may store metadata received by the drive in a memory, and write all or a portion of the data payload into the storage medium. (When referring in this application to the media manager "storing," "reading" or "writing," those skilled in the art will recognize that the media manager need not be performing the actual read/write operations itself, but instead may be controlling standard read/write functionality in a drive, e.g., in the media access logic.) The memory may be a semiconductor memory, such as a RAM in the drive, or a chip in a data cartridge holding the storage medium.

In one embodiment, while the drive receives data from the network for storage on the storage medium, the media manager 206 stores into memory only a portion of the received metadata. The media manager may still write all of the metadata onto the storage medium, however, as well as all or a portion of the data payload. The stored metadata in the memory may include a table of contents (TOC) 208 describing the data payload stored on the storage medium. The TOC 208 may include directory information known in the art, as well as other metadata (file attributes), such as file name, starting physical location (e.g., block) of the file on the storage medium, file size, and a time stamp, for example. The memory storing the TOC acts as a TOC cache, allowing users in the network to quickly access metadata regarding files stored on the drive. This fast access is especially useful if the medium is serially accessible, like tape.

The media manager 206 may select a portion (or all) of the data payload from the storage medium for transfer to the network, and modify the metadata associated with the data payload to reflect characteristics of the selected portion of the data payload, so as to enable the transfer of the selected portion of the data payload together with the associated modified metadata as a new file. For example, if the selected portion is smaller than the entire data payload, then the media manager would modify the associated metadata (TOC) to update the metadata to reflect the size of that portion. Thus, in this example, the media manager has unwrapped the selected payload data portion from the original file, and rewrapped it with the appropriate metadata to create a new file. In an embodiment employing the MXF format (described below), the media manager may use an MXF file unwrapper and file wrapper 210 for these functions. An XML converter 212 allows the generation of MXF headers in XML format.

As another example, the user may want to indicate a change of ownership of the file, or a change in licensing terms, such as an increase in the authorized number of playouts of a video movie. The media manager may update this information in the on-chip TOC cache, as well as change the TOC information on the storage medium nearly simultaneously.

Note that, according to one embodiment of the invention, the media manager does not write the TOC 208 to the storage medium while the data payload is being written to the medium. For example, where the storage medium is tape, the media manager 206 may write the TOC 208 at the beginning of tape (BOT) to allow for later fast access to the TOC information when the tape is loaded in a tape drive of the invention. However, when the data payload is being written, the TOC cannot be written simultaneously to the tape. The media manager may wait for a pause in the writing of payload data to tape, e.g., wait for a file or partition (discussed below) to be written, and then go to the BOT to write the TOC.

According to another embodiment of the invention, the media manager 206 may wait until it has completed writing of payload data to the tape, and, in response to a request to eject the tape, write the metadata from the memory to the tape starting at the BOT or other predetermined location (e.g., before the BOT) before ejection. An example of the storage of metadata before the BOT is given in U.S. application Ser. No. 10/858,911, entitled, "EMULATION OF AUXILIARY MEMORY," filed on Jun. 1, 2004, published Dec. 9, 2004, assigned to the assignee of the present invention, and incorporated by reference in its entirety herein. In that case, the TOC may be located in an additional segment in the eMAM region. By writing the TOC to the storage medium, the medium itself becomes a standalone file system. When the medium is inserted into another drive of an embodiment of the invention, the media manager may read the TOC information from the storage medium, and again store it in the memory for fast access.

A user may wish to add metadata to the existing metadata. For example, a user may want to modify a video file to include Spanish-language subtitles. In the video industry, subtitles are typically stored as part of the metadata, instead of the data payload. Adding a new subtitle in a conventional system would typically require rewriting the entire file. An embodiment of the invention avoids this requirement. Because subtitle data can require a large storage area, the media manager 206 may be configured to avoid writing this data on chip. Instead, the media manager may store the new metadata to the storage medium (e.g., in a segment of the eMAM region before the BOT), and provide a pointer in the TOC on-chip cache (the pointer also being located in a TOC area on tape, in one embodiment) to the location of the new metadata in the storage medium. According to this embodiment of the invention, when the original file is read from the drive, the pointer in the TOC would cause the subtitle metadata to be retrieved as well.

Because the drive of the invention may use only one TOC for all backup data sets, the drive avoids the need to read multiple TOCs to find a specified file on the storage medium. Thus, if the host application instructs the drive to back up a file that has previously been backed up, the drive may write the file to the storage medium, e.g., after the end of the existing data on the tape, and update the TOC to point to the new location on the storage medium as the location of the file (i.e., the current copy/version of the file at the time of backup).

If the host instructs the drive to delete a file, then the drive may merely update the TOC to eliminate any reference to the file without the need to actually erase the file on the storage medium. In the same vein, a file (e.g., subtitles) may be replaced by writing the new file after the end of data on the storage medium, and updating the pointer in the TOC to point to the beginning (e.g., the first block) of the new file on the storage medium while eliminating reference to the old file, without actually erasing the old file. In another example, a portion of a file may be "virtually" stored on the storage medium, by updating the TOC to refer only to the endpoints of the portion, without actually modifying the file itself. The name of the file in the TOC may also be modified to reflect that the TOC now refers only to a portion of the original file ("videoexcerpt"). In many instances, this ability to update only the TOC avoids the need to rewrite the entire storage medium.

In some embodiments, if the metadata (e.g., the subtitles) is larger than the area on the storage medium to which it may initially be written (e.g., a segment of the eMAM region), then the media manager would store a portion of the metadata in that first area, and the remaining portion in another area of the storage medium, e.g., by appending the remaining metadata to the end of data (EOD) on tape, or to the end of data within a partition (see description of partitions below). The TOC on tape and/or on-chip would provide a pointer to the location of both the initial and remaining portions of the metadata on the tape. The media manager may then read this pointer information to provide access to the metadata.

Figure 3:
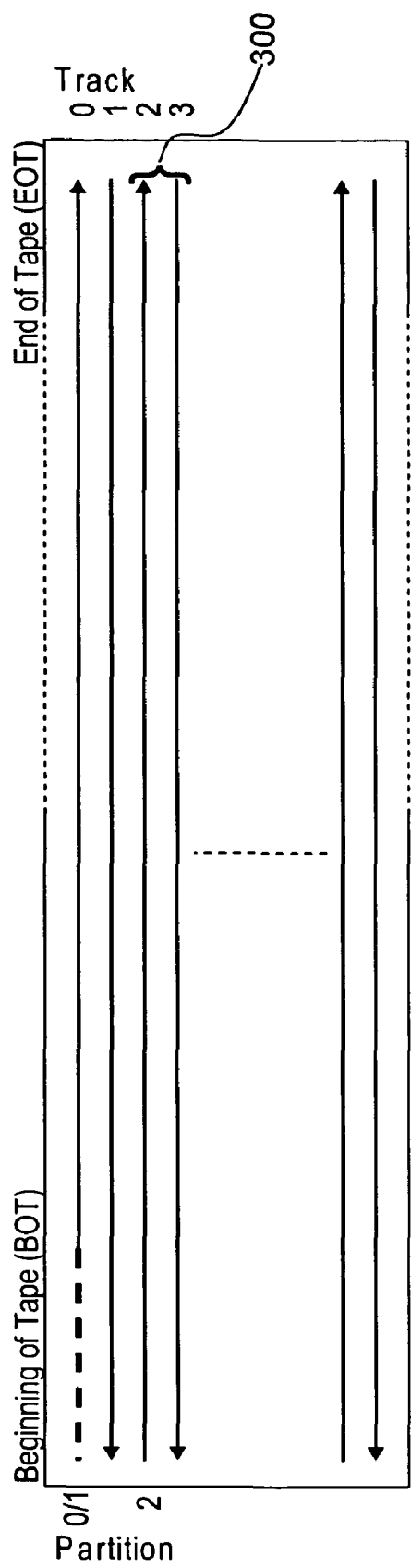
FIG. 3 illustrates formatting of a tape according to an embodiment of the invention.

Referring to FIG. 3, the tape may be formatted into at least one partition, where each partition comprises at least one track pair 300. (The figure illustrates an example where each partition comprises only one track pair.) On a tape following a linear format (such as SDLT), data is written according to a serpentine pattern, i.e., from BOT to end of tape (EOT) for the first physical track (usually denoted "track 0"), and then from EOT to BOT for the second physical track (e.g., "track 1"). A track pair consists of one "roundtrip," e.g., tracks 0 and 1 together. By formatting tape in this manner, the media manager may add data to tape not merely by appending data starting at the end of data (EOD) on the tape (as is usually done), but by appending data beginning at the end of data within a partition. Also, the media manager may erase the data within a partition without affecting other partitions, allowing new data to be written from the beginning of the erased partition. The media manager may also store as metadata in memory the number of partitions, as well as a list of files indexed by their corresponding partition numbers. Because each track pair is long, this partitioning method is especially well suited for large files, such as video files for movies and television programs.

The media manager may cause the metadata to be written at the beginning of a partition; in particular at the beginning of the first partition on the tape. The portion of the first partition holding the metadata may be treated for addressing purposes as a logical first partition ("partition 0")(shown by dashed lines), with the remainder of the physical medium being treated as a second logical partition ("partition 1"). Because the length of the first logical partition may be short compared to the rest of the track pair, the data payload at partition 1 may effectively be almost at BOT. The length of partition 0 may be fixed.

The drive of the present invention may take advantage of the industry-standard material exchange format (MXF) format. The MXF format is well-known in the art, and is described in proposed standard SMPTE 377M, *Material Exchange Format (MXF) File Format Specification (Standard)*, Jun. 24, 2003, for example, which is incorporated by reference herein in its entirety. As is known in the art, MXF metadata may be formatted into KLV (key/length/value) fields 400, 402, 404. MXF metadata may carry information concerning attributes such as file structure, body contents (e.g., MPEG, DV), key words or titles, subtitles, editing notes, location, time, date, and version numbers.

Figure 4:
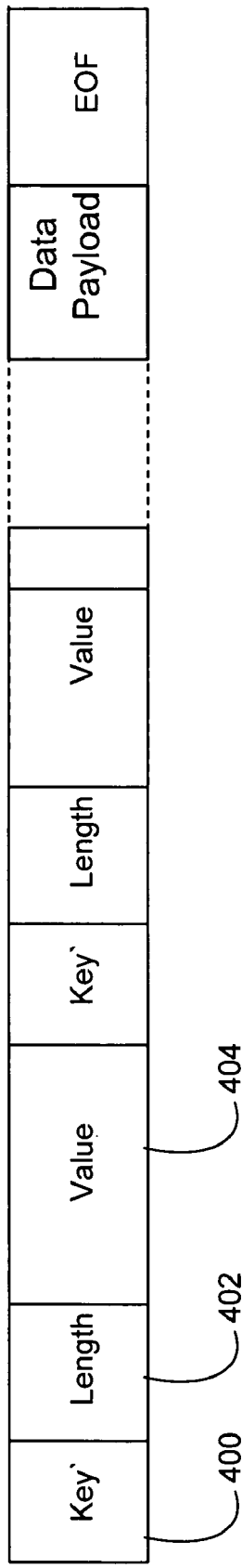
FIG. 4 illustrates a file structure including MXF metadata according to an embodiment of the invention.

FIG. 4 illustrates a file structure including MXF metadata according to an embodiment of the invention, as well as the data payload and an end of MXF file marker. To save space, the media manager of the invention typically may avoid writing to the TOC in memory all of the MXF metadata from the incoming file, but would instead select only metadata considered appropriate for the application. Such selected metadata may include, for example, UMID, OP, time codes, and essence type.

The drive of the invention may work with both MXF and non-MXF files. An MXF file will typically include both MXF-specific metadata and non-MXF-specific file system metadata. Referring to FIG. 5, the media manager 206 will thus create a TOC 208 that includes both selected MXF metadata and non-MXF file system metadata for MXF files. For non-MXF files, the TOC may include only non-MXF file system metadata. Some of the non-MXF specific file system metadata that may be written to the TOC may include, for example, filename (or folder name), file size, location of files on tape, and logical location of files in a folder tree.

The TOC may be created dynamically as each file is written. The TOC enables each tape to act as a standalone file system by keeping file system metadata and directory information for each file stored on the tape. In one embodiment, by keeping a copy of select MXF metadata for each MXF file on tape, the TOC enables fast access to the MXF data.

Figure 6:
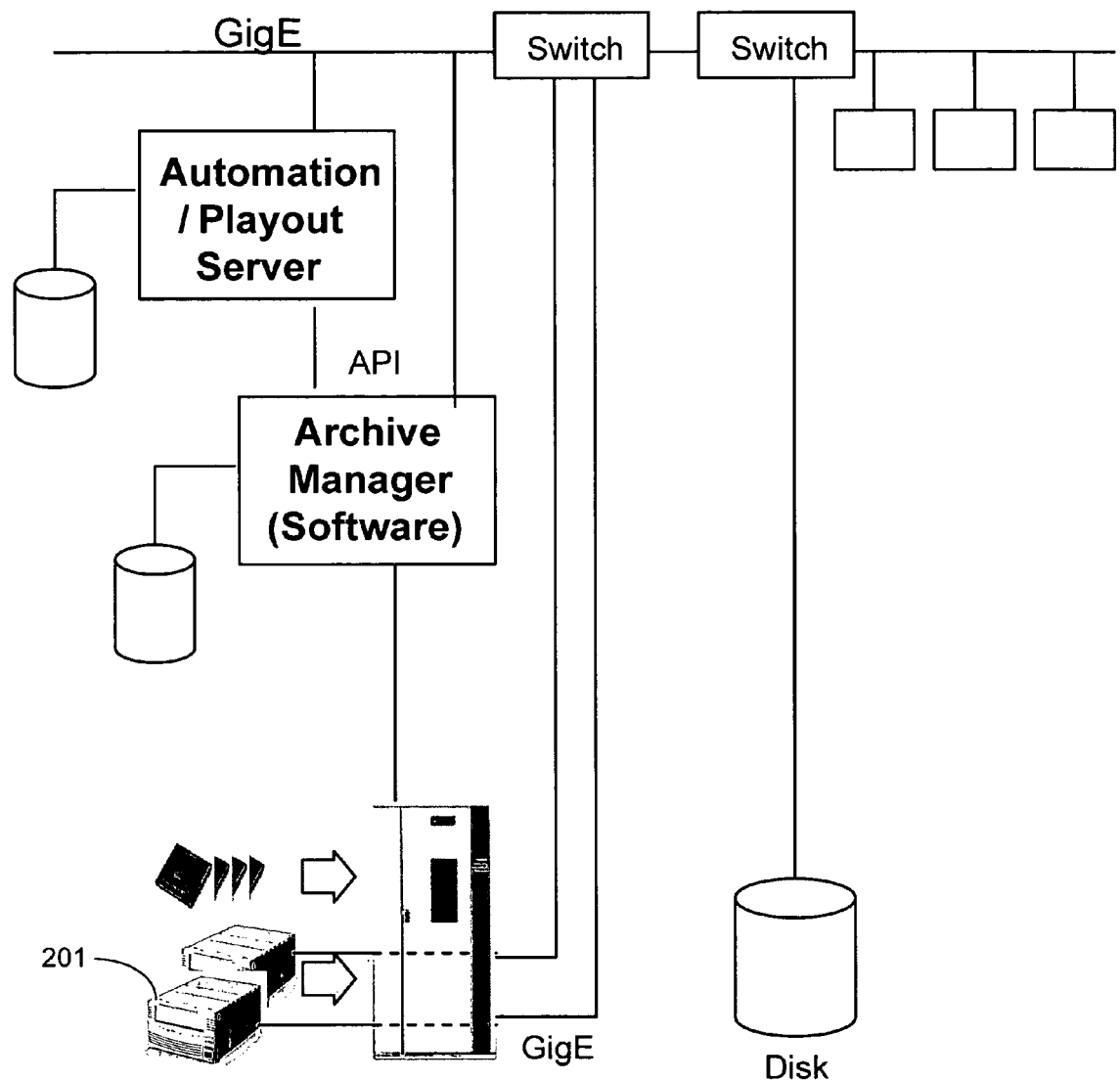
FIG. 6 illustrates a network incorporating a library employing storage drives according to an embodiment of the present invention.
Figure 7:
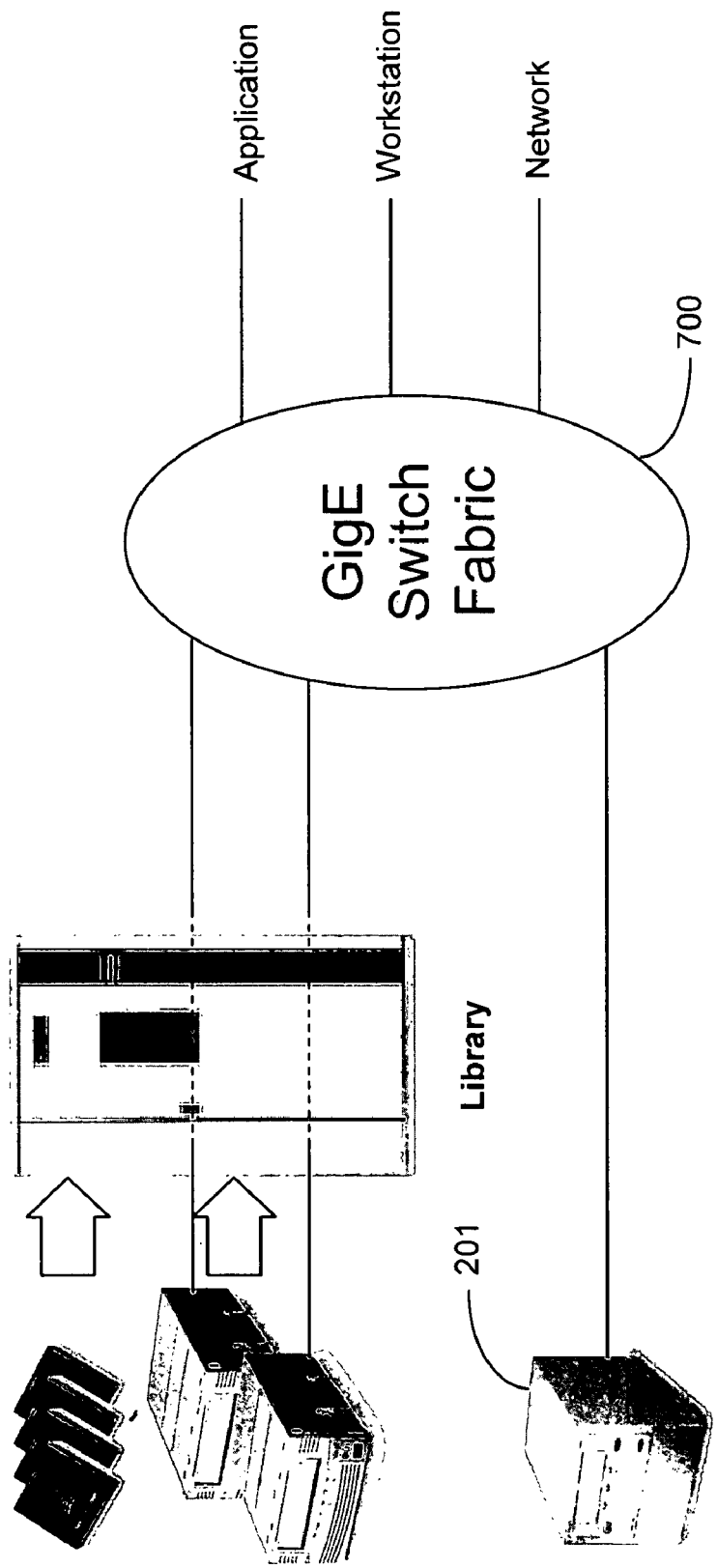
FIG. 7 illustrates connectivity of a drive or library according to embodiments of the invention to a network, application or workstation through a GigE switch fabric.

FIG. 6 illustrates a network including a storage drive according to an embodiment of the present invention. Similarly, FIG. 7 illustrates connectivity of a drive and library, according to embodiments of the invention, to a network, application or workstation through a GigE switch fabric 700. Note that the drive eliminates the need for data movers, and eliminates the need for the archive manager to translate between network and device protocols, and maintain a mapping of files to physical locations on tape. The host application does not need to maintain its own TOC, but rather just needs to provide a file name to the drive, according to embodiments of the invention. Thus, the invention allows "plug and play" access to a storage drive.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention. For example, the partition format described herein may, or, in some instances, may not necessarily be used in conjunction with other embodiments of the invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A tape drive for operation on a network, the tape drive comprising:

file transfer logic encoded on a non-transitory medium operative, when executed, to cause a processor to transfer file data to and from the network according to a network file transfer protocol;

media access logic encoded on a non-transitory medium operative, when executed, to cause a processor to read and write data to a tape cartridge associated with the tape drive according to a storage device communication protocol, wherein the tape cartridge comprises magnetic tape with a plurality of linear tracks; and media management logic encoded on a non-transitory medium operative, when executed, to cause the processor to translate file-based commands received by the file transfer logic from the network according to the file transfer protocol into sequential-access device commands according to the storage device communication protocol, the media management logic is operative to cause the processor to, responsive to network file transfer protocol commands to store a file, write Table of Contents (TOC) data to a TOC region of the tape cartridge, the TOC data comprising data that indexes one or more files to physical data locations of the tape cartridge, and write file data corresponding to the one or more files to a payload region of the tape cartridge;

the media management logic is operable to cause the processor to store at least a portion of file metadata in a first region of the magnetic tape, and, if the file metadata is larger than the first region, store the remainder of the metadata in a second region of the magnetic tape, in which case the TOC data maintains a mapping of the metadata to the first region and the second region, wherein the second region is after an end of existing data already stored on the magnetic tape, and wherein the at least one file is formatted according to the MXF format.

2. The drive of claim 1, wherein the network file transfer protocol comprises an Ethernet protocol, and the storage device communication protocol is SCSI.

3. The tape drive of claim 1 wherein the storage device communication protocol comprises a fiber channel interface.

4. The tape drive of claim 1, wherein the tape cartridge further comprises memory and wherein the media management logic is operable to cause the processor to store file metadata corresponding to the one or more files in the TOC region on the tape cartridge, and to store a portion of the file metadata in memory.

5. The tape drive of claim 4, wherein the media management logic is further operative to cause the processor to store second metadata related to the file metadata in the memory by:

storing the second metadata on the tape cartridge; and
   providing in the TOC region a pointer to the second metadata.

6. The tape drive of claim 1, wherein the file transfer logic includes an FTP server.

7. The tape drive of claim 1, wherein, the media management logic is operable to cause the processor to write TOC data corresponding to a first file to the tape cartridge after the data of the first file is written to the tape cartridge and before ejection of the tape cartridge.

8. The tape drive of claim 1, wherein the media management logic is operable to cause the processor to write TOC data corresponding to the one or more files near the beginning of the magnetic tape without erasing existing data on the magnetic tape.

9. The tape drive of claim 1, wherein the magnetic tape is formatted into at least one partition, each partition comprising at least one track pair of the plurality of linear tracks, and further wherein data within a partition not at the end of tape may be appended with other data received from the network, and the media management logic is operable to cause the processor to write the TOC data to a partition without erasing existing data in other partitions.

10. The tape drive of claim 9, wherein the TOC region is located at the beginning of a first partition.

11. The tape drive of claim 1, wherein at least one file is formatted according to the MXF format, and the data payload comprises video data.

12. The tape drive of claim 1, wherein the metadata includes MXF-specific metadata and non-MXF-specific file metadata.

13. The tape drive of claim 1, further comprising a random-access memory and wherein the media management logic is operable to cause the processor to store the TOC data in the memory of the tape cartridge.

14. The tape drive of claim 13 wherein the TOC data stored in the random access memory is available to users over the network via the file transfer logic for faster access.

15. The tape drive of claim 1 wherein the TOC data further comprises file directory information identifying a logical location of one or more files in a folder tree.

16. The tape drive of claim 15 wherein the TOC data, for each file of the one or more files, further comprises a file name.

17. The tape drive of claim 15 wherein the TOC data, for each file of the one or more files, further comprises a file name and a file size.

18. The tape drive of claim 15 wherein the TOC data, for at least one file of the one or more files, further comprises metadata extracted from the at least one file.

19. A method comprising:
transferring file data to and from a network according to a network file transfer protocol, wherein the file data corresponds to a plurality of files, each file comprising a data payload and metadata;
translating network file transfer protocol-based commands received from the network according to the network file transfer protocol into tape drive commands according to a storage device communication protocol, the tape drive commands for controlling reading and writing data on the tape cartridge;
storing, responsive to network file transfer protocol commands to store a file, Table of Contents (TOC) data to a TOC region of a tape cartridge, the TOC data comprising data that indexes one or more files to physical data locations of the tape cartridge, and write file data corresponding to the one or more files to a payload region of the tape cartridge; and
storing at least a portion of file metadata in a first region of the tape cartridge; and if the file metadata is larger than the first region, storing the remainder of the metadata in a second region of the tape cartridge, in which case the TOC data maintains a mapping of the file metadata to the first region and the second region,
wherein the second region is after an end of existing data already stored on the tape cartridge, and
wherein at least one file is formatted according to the MXF format.

20. The method of claim 19, wherein the network file transfer protocol comprises an Ethernet protocol, and the storage device communication protocol is SCSI.

21. The method of claim 19, wherein the storage device communication protocol comprises a fiber channel interface.

22. The method of claim 19, further comprising storing the TOC data in a memory.

23. The method of claim 22 wherein the memory is a random access memory, and wherein the method further comprises making the random access memory available to users over the network via file transfer logic for faster access.

24. The method of claim 22, wherein the memory is located in the tape cartridge.

25. The method of claim 19, further comprising:
selecting a portion of the data payload from the tape cartridge for transfer to the network, and modifying file metadata associated with the data payload to reflect characteristics of the selected portion of the data payload, so as to enable the transfer to the network of the selected portion of the data payload and the associated modified metadata.

26. The method of claim 19, further comprising maintaining the TOC region near the beginning of the tape cartridge without erasing existing data on the tape cartridge as new files are stored on the tape cartridge.

27. The method of claim 19, wherein the data payload comprises video data.

28. The method of claim 19 wherein the TOC data further comprises file directory information identifying a logical location of one or more files in a folder tree.

29. The method of claim 28 wherein the TOC data, for each file of the one or more files, further comprises a file name.

30. The method of claim 28 wherein the TOC data, for each file of the one or more files, further comprises a file name and a file size.

31. The method of claim 28 wherein the TOC data, for at least one file of the one or more files, further comprises metadata extracted from the at least one file.

32. A tape drive apparatus, comprising:
file transfer logic encoded on a non-transitory medium operative, when executed, to cause a processor to transfer file data according to a file transfer protocol, wherein the file data corresponds to a plurality of files;
media access logic encoded on a non-transitory medium operative, when executed, to cause a processor to read and write data to a tape cartridge associated with a tape drive according to a storage device communication protocol, wherein the tape cartridge comprises magnetic tape with a plurality of linear tracks; and
media management logic encoded on a non-transitory medium operative, when executed, to cause the processor to:
write the file data to the tape cartridge and Table of Contents (TOC) data to the tape cartridge, the TOC data comprising data that indexes one or more files of the plurality of files to physical data locations of the tape cartridge; and
store at least a portion of file metadata in a first region of the magnetic tape, and, if the file metadata is larger than the first region, store the remainder of the metadata in a second region of the magnetic tape, in which case the TOC data maintains a mapping of the metadata to the first region and the second region,
wherein the second region is after an end of existing data already stored on the magnetic tape, and
wherein the at least one file is formatted according to the MXF format.

33. The tape drive apparatus of claim 32 further comprising a memory and wherein the media management logic is further operative to cause the processor to write the TOC data to the memory.

34. The tape drive apparatus of claim 33 wherein the TOC data stored in the memory is available to users over the network via the file transfer logic for faster access.

35. The tape drive apparatus of claim 32 further comprising a tape drive.

36. The tape drive apparatus of claim 32 wherein the TOC data further comprises file directory information identifying a logical location of one or more files in a folder tree.

37. The tape drive apparatus of claim 36 wherein the TOC data, for each file of the one or more files, further comprises a file name.

38. The tape drive apparatus of claim 36 wherein the TOC data, for each file of the one or more files, further comprises a file name and a file size.

39. The tape drive apparatus of claim 36 wherein the TOC data, for at least one file of the one or more files, further comprises metadata extracted from the at least one file.

40. The tape drive apparatus of claim 32 wherein the TOC data is written near the beginning of the magnetic tape of the tape cartridge.

41. The tape drive apparatus of claim 32 wherein the TOC data is written near the end of the magnetic tape of the tape cartridge.

42. The tape drive apparatus of claim 32 wherein the file transfer protocol is a network file transfer protocol.

* * * * *